(12) United States Patent
Felske et al.

(10) Patent No.: US 9,064,093 B1
(45) Date of Patent: Jun. 23, 2015

(54) METHOD AND SYSTEM FOR CONTENT DETECTION AND INTERCEPTION IN COMMUNICATION NETWORKS

(75) Inventors: Kent Felske, Kanata (CA); James Aweya, Kanata (CA); Delfin Montuno, Kanata (CA); Michel Ouellette, Plantagenet (CA)

(73) Assignee: Apple Inc., Cupertino, CA (US)

( * ) Notice: Subject to any disclaimer, the term of this patent is extended or adjusted under 35 U.S.C. 154(b) by 1832 days.

(21) Appl. No.: 10/745,065

(22) Filed: Dec. 22, 2003

(51) Int. Cl.
*G06F 21/00* (2013.01)

(52) U.S. Cl.
CPC ........................................ *G06F 21/00* (2013.01)

(58) Field of Classification Search
USPC ....................................................... 705/50–79
See application file for complete search history.

(56) References Cited

U.S. PATENT DOCUMENTS

| | | | | |
|---|---|---|---|---|
| 5,124,984 A * | 6/1992 | Engel | ............................. | 370/230 |
| 5,572,590 A * | 11/1996 | Chess | ............................. | 726/22 |
| 6,131,162 A * | 10/2000 | Yoshiura et al. | ............. | 713/176 |
| 6,137,987 A * | 10/2000 | Hashimoto | ................... | 399/366 |
| 6,327,656 B2 * | 12/2001 | Zabetian | ....................... | 713/176 |
| 6,683,966 B1 * | 1/2004 | Tian et al. | ..................... | 382/100 |
| 6,732,180 B1 * | 5/2004 | Hale et al. | ..................... | 709/229 |
| 7,047,406 B2 * | 5/2006 | Schleicher et al. | ........... | 713/168 |
| 7,293,294 B2 * | 11/2007 | Ukai et al. | ..................... | 726/32 |
| 7,334,124 B2 * | 2/2008 | Pham et al. | .................... | 713/162 |
| 7,363,278 B2 * | 4/2008 | Schmelzer et al. | ............. | 705/67 |
| 2002/0065938 A1 * | 5/2002 | Jungck et al. | ................. | 709/246 |

OTHER PUBLICATIONS

Schneier et al., Applied Cryptography, 1996.*

* cited by examiner

*Primary Examiner* — James A Reagan
(74) *Attorney, Agent, or Firm* — Meyertons, Hood, Kivlin, Kowert & Goetzel, P.C.

(57) ABSTRACT

A system in which data signatures are used to identify copyrighted content passing through a network. The data signatures are derived from files containing copyrighted content to be identified. The signatures are used to search within peer-to-peer data streams flowing through one or more network nodes in a communications network. Any specific technique may be used for pattern recognition between the signatures and the monitored traffic. When a particular file of interest is identified, the system may operate to perform one or more of several possible actions, including stopping the transmission, allowing the transmission but recording the event, making an offer to the recipient allowing them to legally purchase the file, or sending alternative information or intentionally corrupting the information to render it useless to the recipient.

17 Claims, 4 Drawing Sheets

METHOD AND SYSTEM FOR CONTENT DETECTION AND INTERCEPTION IN COMMUNICATION NETWORKS

FIELD OF THE INVENTION

The present invention relates generally to communication systems, and more specifically to a method and system for providing content detection and interception in a communication network.

BACKGROUND OF THE INVENTION

As it is generally known, the illegal sharing of copyrighted material over the Internet through peer-to-peer ("P2P") networking programs results in significant amounts of lost revenue for the music, movie and software industries. It has been estimated that the music and movie industries lose billions of dollars a year as a result of unlicensed file sharing, and that a ten percent decrease in global software piracy would create millions of new jobs. As a consequence, there is a great interest in techniques for controlling digital transfers of copyrighted materials, in order to stem these losses.

Some attempts to identify and control illegal file sharing have involved the use of digital water marks, consisting of bit patterns embedded into copyrighted files to identify the source of illegal copies. These efforts have proven ineffective. Similarly, attempts to incorporate special codes into media storing original copyrighted material to prevent unauthorized copying of the material to a computer system have also been unsuccessful.

Network service providers, such as Internet Service Providers (ISPs) and Incumbent Local Exchange Carriers (ILECs), are currently being taken to court to determine their potential liability for the transfer of unauthorized content in P2P traffic flowing through their networks. Additionally, these network service providers frequently face network congestion in their shared networks caused by large amounts of P2P traffic. These conditions are driving network service providers to find some way to control the use of their networks with respect to illegal file sharing.

A number of traffic management products exist that can identify P2P data streams based on detection of P2P protocol traffic. These systems operate to block P2P traffic, gather accurate statistics regarding P2P traffic, or impose traffic management, such as bandwidth limits, on relevant network links. For example, existing systems include products of PCUBE Labs, Allot Communications, Ltd., Packeteer, Inc., Ellacoya Networks, and Sandvine Incorporated, that detect P2P protocol traffic and manage network parameters. However, these systems are limited in that they cannot identify sharing activity related to a specific file, have no way of informing a copyright holder that a specific file has been copied, and fail to seek or facilitate in any way authorization of a detected file sharing activity.

For the above reasons and others, it would be desirable to have a new system for preventing illegal sharing of copyrighted material over a communications network. The system should provide a mechanism for notifying copyright holders that their files are being shared, and enable copyright holders to promote payment for the use and/or copying of their copyrighted files.

SUMMARY OF THE INVENTION

To address the problems described above and others, a new system and method are disclosed, in which data signatures are used to identify copyrighted content passing through a network. The data signatures of the present system are derived from files containing the copyrighted content to be identified. The signatures are used to search within peer-to-peer data streams flowing through one or more network nodes in a communications network. The disclosed system may employ any specific technique for pattern recognition between the signatures and the monitored traffic, and is not limited to a particular pattern recognition approach. The file used to generate a signature may or may not be compressed or preprocessed in some way. A file used to generate a signature may, for example, be obtained through the peer-to-peer protocol which is being monitored, filtered, or blocked by the disclosed system.

When a particular file of interest is identified, the disclosed system may operate to perform one or more of several possible actions. First, the disclosed system may operate to stop the transmission, preventing the unauthorized transfer of the copyrighted material. Second, the disclosed system may operate to allow transmission but record the event, for reporting to the copyright owner or other party. Third, the disclosed system may operate to interrupt the transmission, and make an offer to the recipient allowing them to legally purchase the file. Fourth, the disclosed system may operate to send alternative information or intentionally corrupt the information to render it useless to the recipient.

The disclosed system prevents the transmission of unwanted peer to peer data traffic such as the sharing of copyrighted music files, video files, software code, transactional files or other data files common on the Internet today. The disclosed system advantageously addresses the problem of illegal use of peer-to-peer networking protocols for unlicensed conveyance of copyrighted materials. The disclosed system provides a way to identify specific file content, thereby distinguishing between illegal copying of copyrighted material, and legal copying over peer-to-peer networks. The disclosed system can further operate to identify network traffic not associated with revenue generation for a network operator, and police and throttle such non-revenue generating traffic.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
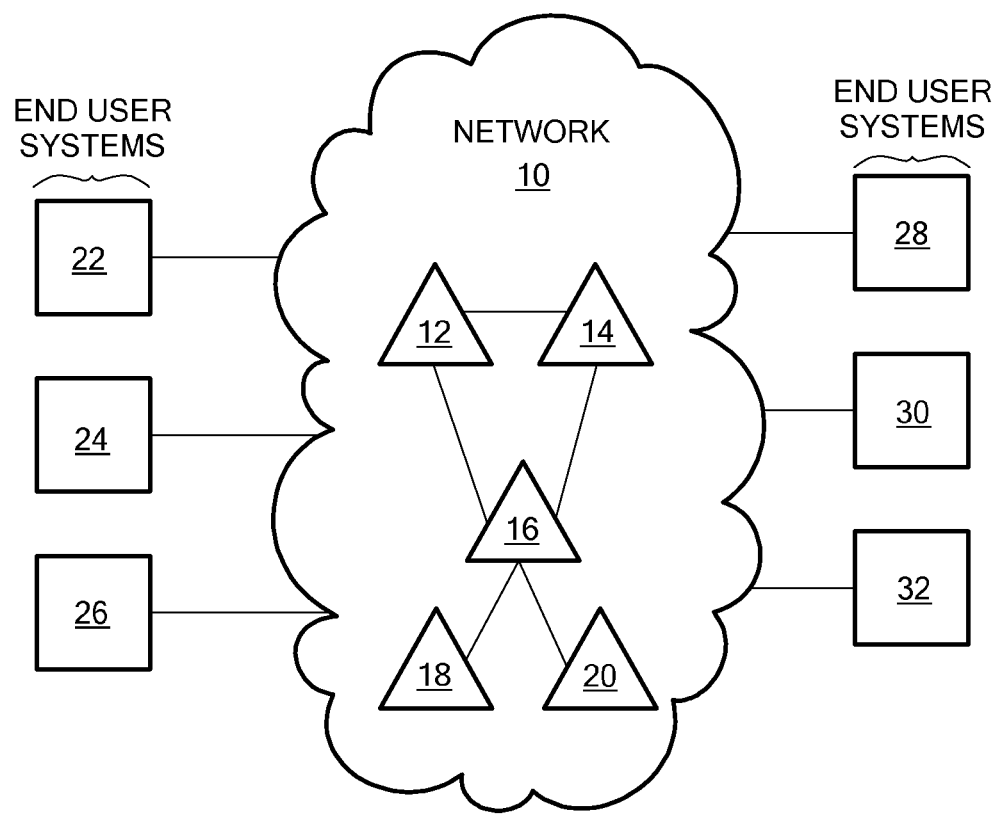
FIG. 1 is a block diagram showing an example of devices embodying the disclosed system.

FIG. 1 shows a communications network 10, including a number of networking devices, shown as packet forwarding devices 12, 14, 16, 18 and 20. The packet forwarding devices 12, 14, 16, 18 and 20 may be switches, routers, bridges, or any other specific type of packet forwarding, networking device. Each of the networking devices in the network 10 include one or more processors and associated program storage for storing computer programs executable on such processors, as well as dedicated hardware circuits for performing specific operations within the devices. The network 10 may, for example, represent networking equipment under control of a service provider, such as an Internet Service Provider (ISP) or Incumbent Local Exchange Carrier (ILEC). The network 10 may operate using any appropriate networking protocols and message formats, including the Internet Protocol (IP), and IP packets.

Also shown, in FIG. 1 are end user systems 22, 24, 26, 28, 30 and 32, each of which are communicably coupled to the network 10. The end user systems 22, 24, 26, 28, 30 and 32 of FIG. 1 may, for example, be computer systems including at least one processor and associated program stores for storing computer programs executable on such processors. The end user systems of FIG. 1 may be personal computers interfaced to the network 10 in order to access the Internet or some other shared network.

During operation of the devices shown in FIG. 1, users of the end user systems 22, 24, 26, 28, 30 and 32 may execute software programs that enable music and file swapping by transferring files over the network 10 in the payloads of data packets, such as IP packets. Such software programs exist on the Internet, and allow users to have access to other users' files residing on hard disks within the end user systems 22, 24, 26, 28, 30 and 32, creating a peer-to-peer, file sharing network. Examples of such software programs that enable such peer-to-peer file sharing are the Napster service (www.napster.com), as well as Gnutella (www.gnutella.com), Grokster (www.grokster.com), KazaA (www.kazaa.com) and others. Systems such as these have, in the past, been used to provide peer-to-peer sharing of copyrighted files without obtaining authorization from the copyright holders.

Peer-to-peer file sharing networks operate from user to user. Peer-to-peer operation implies that either side can initiate a session and has equal responsibility, but users of peer-to-peer systems may require data from a third computer system. For example, the Napster file sharing service is considered a peer-to-peer network, but also used a central server to store a public directory. Generally speaking, a peer-to-peer network is any communications environment that allows desktop and laptop computers in the network to act as servers and share their files with other users on the network.

Figure 2:
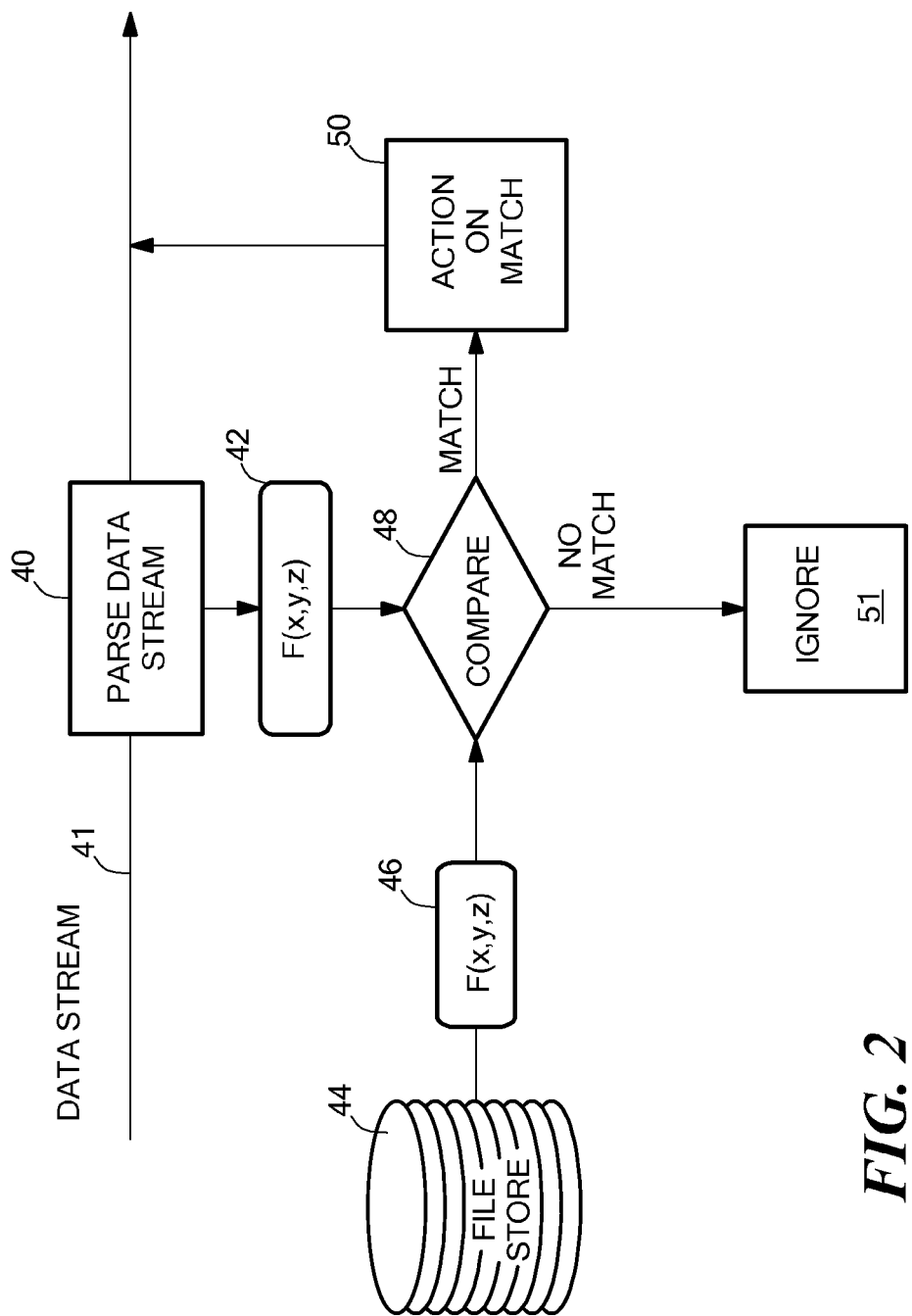
FIG. 2 is a block diagram showing operation of an embodiment of the disclosed system.

FIG. 2 shows operation of one of the networking devices 12, 14, 16, 18 and 20 of FIG. 1 in accordance with an embodiment of the present invention. As shown in FIG. 2, a data stream 41 is parsed 40 by the networking device, in order to identify those messages in the data stream associated with peer-to-peer networks. For example, a determination as to whether a given message is associated with a peer-to-peer network may be made based on the values of one or more fields in headers of the messages, such as IP packet header contents. The protocols for peer-to-peer traffic vary with the specific peer-to-peer software being used, and each specific type of peer-to-peer software may be detected based on a different set of values in the packet headers of the data stream 41.

In the event that the parsing 40 of the data stream 41 results in identification of a message associated with a peer-to-peer network protocol, then a digital signature is derived from the payload of that message, shown for purposes of illustration as the digital signature 42. The digital signature 42 is, for example, the result of applying a function, shown as F(x,y,z), to the message payload. The specific technique used to obtain the digital signature 42 may involve any appropriate method for obtaining a digital signature. For example, the digital signature 42 may consist of or include a portion of the message payload.

The disclosed system further operates to compare 48 the message payload digital signature 42 with a file content digital signature 46. The file content digital signature is, for example, obtained using the same function, shown as F(x,y,z), that was used to obtain the payload digital signature 42. The file content digital signature 46 is obtained by applying the predetermined function to one or more content files obtained from the file store 44, which may be locally or remotely stored with respect to the networking device processing the data stream 41. In the event that the payload digital signature 42 matches the file content signature 46, a predetermined action 50 is performed. Otherwise, if there is no match between the file content digital signature 46 and the payload digital signature 42, the message is ignored 51, and permitted to pass through the networking device. The comparison 48 may be performed between the payload digital signature 42 and one or more file content digital signatures 46 derived from corresponding files stored in the file store 44. The files stored in the file store 44 are, for example, copyrighted files that are of interest with respect to copying over networking equipment under control of a network service provider. Such files may include various types of data, including music, movies, software, etc., stored either in compressed or uncompressed format.

The comparison 48 may further maintain data regarding inexact matches between payload digital signatures 42 and file content digital signatures 46 (e.g. a file content digital signature partially matches a payload digital signature). In the event such inexact matches exceed a predetermined threshold, an alarm or other notification may be issued to a predetermined destination or user.

A match detected at step 48 of FIG. 2 does not necessarily indicate that content within the message payload is being illegally copied. For example, some number of registered content distributors may be licensed or otherwise permitted to transmit a given file stored in the content store 44. In such a situation, a match detected at step 48 would indicate an illegal copying only in the event a determination is made that the source of the message is not one of the registered content distributors. Such a determination may, for example, be based on examination of address information within one or more fields of a header portion of the message, and a comparison with address information associated with the registered content distributors.

Figure 3:
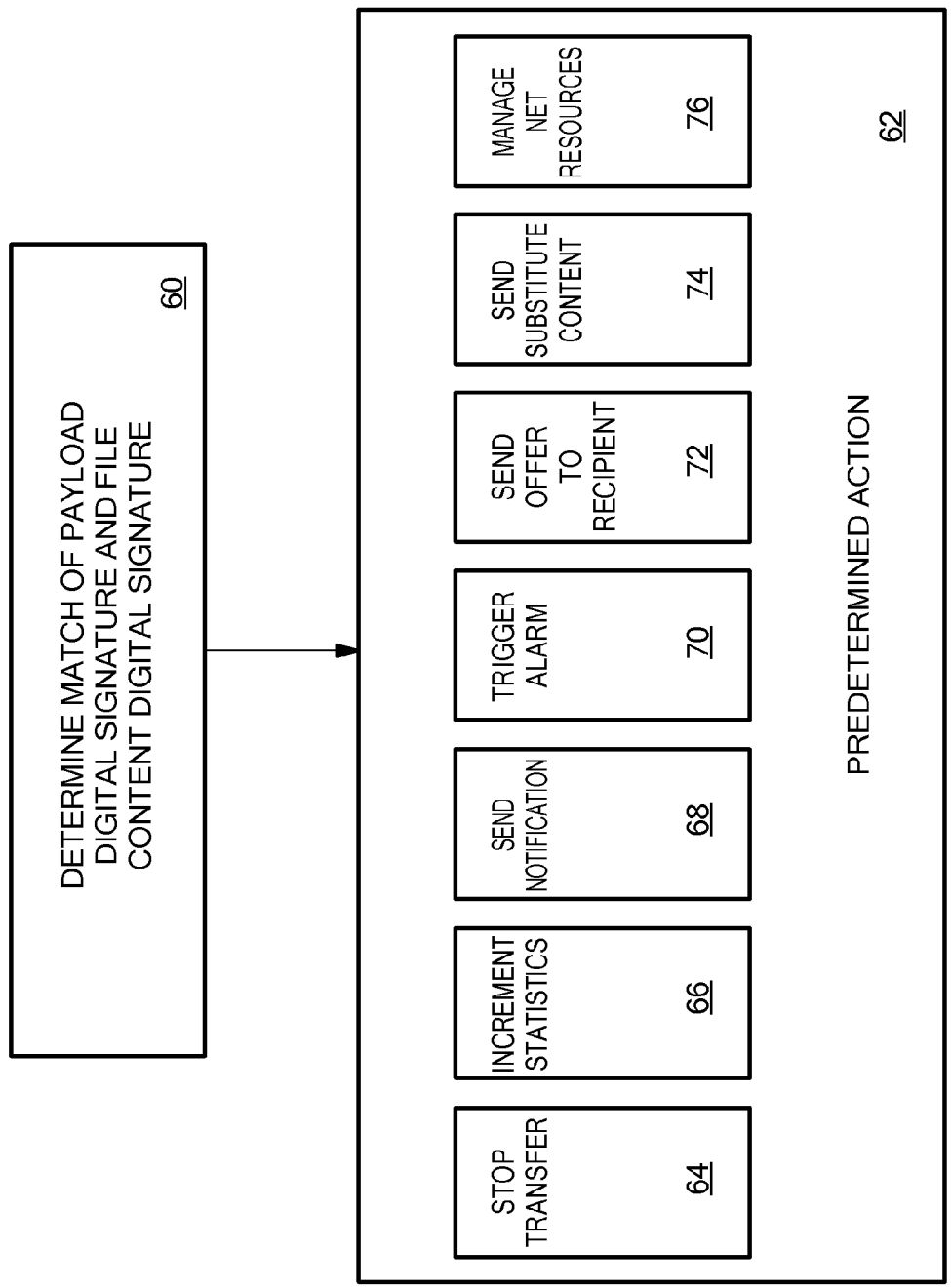
FIG. 3 is a flow chart illustrating steps performed during operation of an embodiment of the disclosed system.

FIG. 3 is a flow chart illustrating operation of the disclosed system upon determination that there is a match between a payload digital signature and a file content digital signature at 60. The predetermined action 62 resulting from the determination of the matching digital signatures at step 60 may, for example, include one or more of the specific actions described in FIG. 3. As shown in FIG. 3, the predetermined action 62 may include stopping the transfer 64 of the message determined to have a payload digital signature matching a file content digital signature. Stopping the transfer 64 of the message may include performing actions to stop the transfer of the current message and some number of related, or all of, a set of related future messages. For example, stopping a single message containing a segment of a larger music file being transferred may not be sufficiently effective. Accordingly, stopping a transfer at step 64 may include storing some state information relating to the current message, such as information from one or more header fields of the message, in order to identify future messages belonging to the same data stream as the current message. Upon detection of subsequently received messages having the same header field value or values, and thus belonging to the same data stream current message, the disclosed system may similarly operate to stop the transfer of such subsequent messages as well.

The predetermined action 62 may include incrementing one or more statistics maintained in the networking device. Such statistics may be based on specific users that are sharing files over the network, and/or specific files of interest that are being shared. The predetermined action 62 may include sending a notification to a predetermined recipient. The notification may consist of an email message or other type of message, and the recipient may be an owner of the copyrighted material in the content file, a network manager, legal authorities, or some other user or account.

The predetermined action 62 may include triggering an alarm 72, for example in response to exceeding some predetermined number of detected copies of one or more predetermined content files. An offer to purchase the associated content file may be sent 72 as the predetermined action 62. Such an offer could be sent to a recipient indicated by the message having the payload resulting in the matching payload digital signature. The disclosed system may further operate to send 74 substitute content to the recipient indicated by the message having the payload resulting in the matching payload digital signature. Such substitute content may, for example, include a warning that the file contents being transferred were being transferred without the necessary authorizations. The disclosed system may further operate to manage network resources as the predetermined action 62. Such management may include limiting the use of network resources allocated to the transfer of one or more predetermined files.

Thus the predetermined action 62 may involve one or more of the specific actions 64, 66, 68, 70, 72, 74, and/or 76, or some other predetermined action, as appropriate for a given embodiment of the present system.

Figure 4:
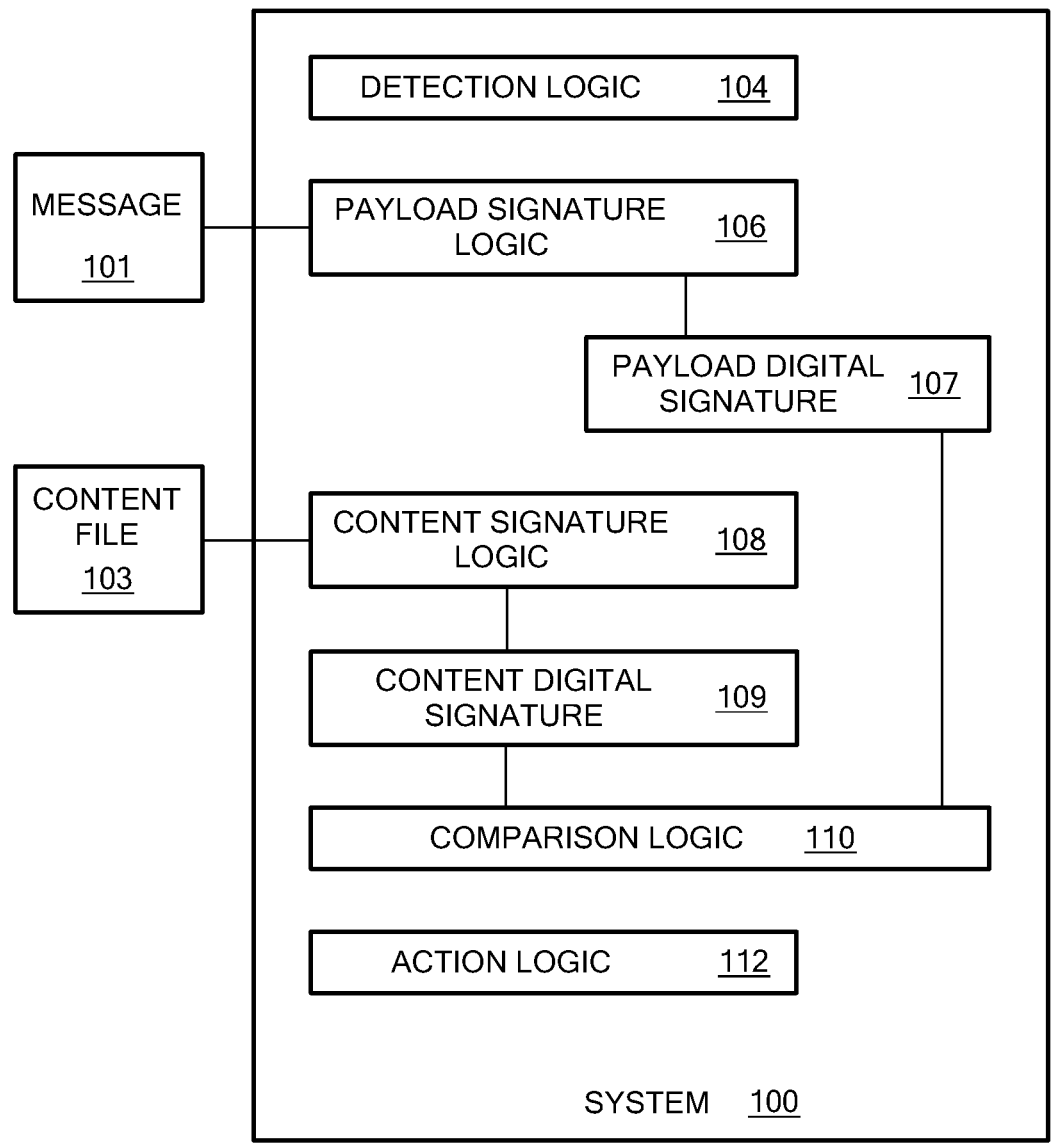
FIG. 4 shows a system for managing the unauthorized copying of files over a network.

FIG. 4 shows a system 100 for managing the unauthorized copying of files over a network, including detection logic 104 operable to detect at least one message 101 being transferred using a predetermined protocol, payload signature logic 106 operable to generate a payload digital signature 107 based on a payload of the message 101, content signature logic 108 operable to obtain at least one file content digital signature 109 based on content of at least one respective content file 103, comparison logic 110 for comparing the file content digital signature 109 with the payload digital signature 107, and action logic 112 operable to perform a predetermined action in the event that the file content digital signature 109 matches the payload digital signature 107.

The predetermined protocol may be a peer-to-peer networking protocol.

The predetermined action may be stopping further transfer of the message 101, incrementing at least one network management statistic to reflect the detection of the message 101, sending a message to a recipient of the message inviting the recipient to purchase an authorized copy of the content file, or triggering an alarm event. The alarm event may be sending a message to a predetermined destination indicating the detection of the message 101, and the predetermined destination may be a sender of the message 101 or an owner of the content file 103.

The predetermined action may be sending a substitute content file to a recipient of the message 101, or sending a corrupted version of the message 101 to a recipient of the message 101.

The comparison logic 110 is further operable to determine whether the file content digital signature 109 partially matches the payload digital signature 107, and in the event that the file content digital signature 109 partially matches the payload digital signature 107, storing indication of the partial match determination.

The predetermined action may include restricting access to at least one resource for processing of a data stream associated with the message 101.

The message 101 being transferred may be an Internet Protocol packet.

The payload digital signature 107 may include a subset of the payload of the message 101.

The file content digital signature 109 may include a subset of the content file 103.

The content signature logic 108 may be further operable to obtain the content file 103 from a remote repository.

The content signature logic may further be operable to obtain the content file 103 from the remote repository by obtaining the content file 103 using a peer-to-peer networking protocol.

At least one of the detection logic 104, payload signature logic 106, content signature logic 108, comparison logic 110, and action logic 112, may be program code stored in a computer readable memory.

At least one of the detection logic 104, payload signature logic 106, content signature logic 108, comparison logic 110, and action logic 112, may be hardware logic.

FIGS. 2 and 3 are block diagram and flowchart illustrations of methods, apparatus (systems) and computer program products according to an embodiment of the invention. It will be understood that each block of the flowchart illustrations, and combinations of blocks in the flowchart illustrations, can be implemented by program code logic consisting of computer program instructions. These computer program instructions may be loaded onto a computer having one or more processors, or other programmable data processing apparatus, to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks. Alternatively, while the invention may be embodied in computer software, the functions necessary to implement the invention may alternatively be embodied in part or in whole using hardware logic components such as Application Specific Integrated Circuits or any other specific types of hardware circuits, or some combination of hardware components and software. Accordingly, the flowchart blocks in FIGS. 2 and 3 may be implemented in whole or in part using such hardware logic.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

We claim:

1. A system comprising:
   at least one processor;
   a computer readable memory having program code stored thereon that is executable by said processor to cause the system to perform operations comprising:
   detecting at least one message being transferred over a network using according to a predetermined protocol;
   generating a payload digital signature based on a payload of said message, wherein said payload digital signature includes a portion of said payload of said message;
   obtaining at least one file content digital signature generated based on content of at least one respective content file, wherein said file content digital signature includes a portion of said at least one respective content file;
   comparing said file content digital signature with said payload digital signature to determine that a match exists between said file content digital signature and said payload digital signature, and based at least partly on the match existing, determining that a network transmission associated with the at least one message corresponds to an unauthorized copying of copyrighted material of said content of said at least one respective content file; and
   based on the network transmission corresponding to the unauthorized copying of copyrighted material, sending a corrupted version of said message to a recipient of said message.

2. The system of claim 1, wherein said predetermined protocol is a peer-to-peer networking protocol.

3. The system of claim 1, wherein the operations further comprise stopping further transfer of said message in response to said file content digital signature matching said payload digital signature.

4. The system of claim 1, wherein the operations further comprise incrementing at least one network management statistic to reflect the detection of said message in response to said file content digital signature matching said payload digital signature.

5. The system of claim 1, wherein the operations further comprise triggering an alarm event in response to said file content digital signature matching said payload digital signature.

6. The system of claim 1, wherein the operations further comprise sending a particular message to a predetermined destination indicating the detection of said message in response to said file content digital signature matching said payload digital signature.

7. The system of claim 6, wherein said predetermined destination comprises a sender of said message.

8. The system of claim 6, wherein said predetermined destination comprises an owner of said content file.

9. The system of claim 1, wherein the operations further comprise sending a substitute content file to a recipient of said message in response to said file content digital signature matching said payload digital signature.

10. The system of claim 1, wherein the operations further comprise restricting access to at least one resource for processing of a data stream associated with said message in response to said file content digital signature matching said payload digital signature.

11. The system of claim 1, wherein said message is an Internet Protocol packet.

12. The system of claim 1, wherein the operations further comprise obtaining said at least one respective content file from a remote repository.

13. The system of claim 12, further comprising:
    wherein said obtaining said at least one respective content file from said remote repository includes obtaining said content file using a peer-to-peer networking protocol.

14. A method, comprising:
    detecting, by a computer system, at least one message being transferred over a network according to a predetermined protocol;
    generating, by the computer system, a payload digital signature based on a payload of said message, wherein said payload digital signature includes a portion of said payload of said message;
    obtaining, by the computer system, at least one file content digital signature based on content of at least one respective content file, wherein said file content digital signature includes a portion of said at least one respective file;
    comparing, by the computer system, said file content digital signature with said payload digital signature to determine that a match exists between said file content digital signature and said payload digital signature, and based at least partly on the match existing, determining that a network transmission associated with the at least one message corresponds to an unauthorized copying of copyrighted material of said content of said at least one respective content file; and
    based on the network transmission corresponding to the unauthorized copying of the copyrighted material, the computer system sending a corrupted version of said message to a recipient of said message.

15. The method of claim 14, further comprising inviting said recipient to purchase an authorized copy of said content file in response to said file content digital signature matching said payload digital signature.

16. The method of claim 14, further comprising responsive to said file content digital signature matching said payload digital signature, identifying subsequent messages belonging to a data stream to which said message belongs, and
    stopping transfer of said subsequent messages belonging to said same data stream as said message.

17. The method of claim 14, wherein the network transmission includes a plurality of IP packets.

* * * * *

UNITED STATES PATENT AND TRADEMARK OFFICE
CERTIFICATE OF CORRECTION

| | | |
|---|---|---|
| PATENT NO. | : 9,064,093 B1 | Page 1 of 1 |
| APPLICATION NO. | : 10/745065 | |
| DATED | : June 23, 2015 | |
| INVENTOR(S) | : Kent Felske et al. | |

It is certified that error appears in the above-identified patent and that said Letters Patent is hereby corrected as shown below:

In the Claims:

Claim 1, Column 7, Line 27, please delete "network using according" and substitute
-- network according --

Signed and Sealed this
Eighth Day of March, 2016

Michelle K. Lee
*Director of the United States Patent and Trademark Office*